US009851225B2

(12) United States Patent
Gregory et al.

(10) Patent No.: US 9,851,225 B2
(45) Date of Patent: Dec. 26, 2017

(54) NONVOLATILE MULTITUM ROTATION SENSOR WITH MAGNETIC PARTICLE FOLLOWING A SPIRAL TRACK

(71) Applicant: Teleldyne Scientific & Imaging, LLC., Thousand Oaks, CA (US)

(72) Inventors: Brian Gregory, Newbury, CA (US); Weiya Zhang, Thousand Oaks, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 261 days.

(21) Appl. No.: 14/705,178

(22) Filed: May 6, 2015

(65) Prior Publication Data

US 2016/0327413 A1    Nov. 10, 2016

(51) Int. Cl.
| G01D 5/26 | (2006.01) |
| G01D 5/165 | (2006.01) |
| G01D 5/20 | (2006.01) |
| G01D 5/24 | (2006.01) |
| G01D 5/245 | (2006.01) |

(52) U.S. Cl.
CPC .............. *G01D 5/26* (2013.01); *G01D 5/165* (2013.01); *G01D 5/2046* (2013.01); *G01D 5/2405* (2013.01); *G01D 5/2458* (2013.01)

(58) Field of Classification Search
CPC .... G01D 5/165; G01D 5/2046; G01D 5/2405; G01D 5/2458; G01D 5/26
See application file for complete search history.

(56) References Cited

U.S. PATENT DOCUMENTS

| 2005/0161304 A1* | 7/2005 | Brandi Alois | .......... F16H 1/125 192/223 |
| 2008/0089200 A1* | 4/2008 | Neckmar | ........... G01N 21/9506 369/53.2 |
| 2011/0303831 A1* | 12/2011 | Nagura | ................ G01D 5/3473 250/231.14 |

FOREIGN PATENT DOCUMENTS

| DE | 102005043301 A1 | 3/2006 |
| JP | 2005147704 | 6/2005 |

OTHER PUBLICATIONS

Machine English Translation of Stuadt et al. (DE 102005043301 A1).*
Extended European Search Report dated Sep. 21, 2016; Application No./Patent No. 16166104.6-1568—(8) pages.

* cited by examiner

*Primary Examiner* — Francis M Legasse, Jr.
(74) *Attorney, Agent, or Firm* — Boyle Fredrickson, SC

(57) ABSTRACT

A non-volatile, absolute rotation sensor employs a radial guide and spiral guide rotating with respect to each other to move a marker element continuously along the radial guide so that a distance of the marker element along the radial guide provides an indication of shaft movement over multiple turns. A sensor system senses the distance of the marker element along the radial guide to provide an electric output.

18 Claims, 4 Drawing Sheets

NONVOLATILE MULTITUM ROTATION SENSOR WITH MAGNETIC PARTICLE FOLLOWING A SPIRAL TRACK

STATEMENT REGARDING FEDERALLY SPONSORED RESEARCH OR DEVELOPMENT

Not applicable

CROSS REFERENCE TO RELATED APPLICATION

Not applicable

BACKGROUND OF THE INVENTION

The present invention relates to rotation sensors and in particular to multi-turn rotation sensor that can output absolute angular positions over a rotational range of greater than 360 degrees.

Rotation sensors, including encoders, resolvers and the like, are electromechanical devices providing an electrical output indicating the position of a rotatable shaft. A common type of rotation sensor uses a disk-shaped rotor having an optically readable pattern marked on its surface, the pattern forming alternating opaque and transmissive frames. These frames are illuminated from one side by a lamp and light traveling from the lamp through the opaque and transmissive frames of the rotor and then through similar frames in a stationary stator, to be detected by one or more stationary photodetectors. Rotation of the shaft moves the rotor which in turn causes a fluctuation in the light transmitted through the rotor and stator thus producing a signal that may be decoded into a digital indication of shaft movement.

Rotation sensors may be classified as absolute rotation sensors or incremental rotation sensors. Incremental rotation sensors provide only an indication of the change in position of the rotation sensor shaft. In incremental rotation sensors, the rotor normally contains a uniform periodic pattern whose movement past a photodetector creates an index signal indicative of the amount that the shaft has rotated. A separate track may also provide a zero signal for a particular angular position. In some cases, one or more photodetectors arranged with an offset of 90 degrees ("quadrature") provide an indication of the direction of rotation as well as amount of rotation of the shaft, as is understood in the art.

Absolute rotation sensors, in contrast to incremental rotation sensors, produce a unique value (typically a digital code word) for each rotation sensor position. The rotor of an absolute rotation sensor may carry a series of concentric tracks whose opaque and transmissive segments, examined along a line of radius, reveal a binary or Grey code value indicative of shaft position. Each track provides the value of one bit and is read by a separate photodetector to produce an output digital word.

Often it is desired to have an absolute measure of rotary position over multiple turns (that is, a measurement that spans an angular range of greater than 360 degrees). This can be done using an absolute single-turn rotation sensor by adding an electronic counter that counts up each time the value from the rotation sensor "rolls over" from its maximum value to zero and down when the rotation sensor rolls over from zero to the maximum value. Precise angular position over multiple turns may be done by adding the output from the absolute single-turn rotation sensor to the value of the counter times 360 degrees.

The use of an electronic counter can allow the absolute angular position to be lost in the event of a power failure which causes the electronic counter to reset.

The problem of creating a "non-volatile" multi-turn absolute rotation sensor, can be addressed replacing the electronic counter with a mechanical counter, for example, using a gear train where successive gears are each attached to simple absolute rotation sensors that provide successive bits in a count value. For example, each gear in the gear train may provide a 2:1 reduction and may connect with a single bit absolute rotation sensor. Each rotation sensor then provides a separate binary digit of a count value.

Two alternative approaches use either a battery or electricity developed by Wiegand wires to write to a nonvolatile memory.

The addition of mechanical gear systems, multiple rotation sensors, batteries, or power generation systems greatly increases the cost, complexity and potential for failure of the resulting rotation sensor.

SUMMARY OF THE INVENTION

The present invention provides an absolute rotation sensor that avoid the disadvantages of prior art systems by using an interacting radial guide and spiral guide which together move a marker element along the radial guide. A sensor system determines the location of the marker within the radial guide to provide a nonvolatile indication of single or multi-turns of the shaft. In some embodiments, a resolution less than a full turn can be obtained in distinction from prior art systems.

Specifically, one embodiment of the invention provides an absolute rotation sensor having a housing supporting a shaft rotatable along an axis. The housing also holds a radial guide slidably supporting a marker element to move along a radial path perpendicular to the axis and a spiral guide corralling the marker element to follow a spiral path about the axis. At least one of the radial guide and spiral guide are attached to the shaft so that the spiral guide rotates about the axis with respect to the radial guide causing the marker element to move progressively along a radial path with rotation of the shaft. A sensor system identifies the location of the marker element along the radial guide to output at least a number of turns of the shaft according to a position of the marker element along the radial guide.

It is thus a feature of at least one embodiment of the invention to provide a nonvolatile, multi-turn, rotation sensor that eliminates the cost and complexity of gearing combining multiple rotation sensors.

The marker element may be a ferromagnetic material, for example, selected from the group consisting of: a ferromagnetic bead, a droplet of ferrofluid, and a droplet of ferrofluid surrounding a magnetized bead.

It is thus a feature of at least one embodiment of the invention to provide a marker element that has extremely low friction.

The radial guide may be a groove constraining the marker element therein.

It is thus a feature of at least one embodiment of the invention to provide a radial guide that may be readily fabricated at small scales using integrated circuit fabrication techniques or the like.

The spiral guide may be a magnetic material attracting the marker element within the radial guide.

It is thus a feature of at least one embodiment of the invention to permit isolation of the marker element within the radial guide to reduce contamination or mechanical wear, and to permit the use of ferrofluidic elements.

The sensor system uses may use a variety of sensors, for example, selected from the group consisting of: optical, resistive, capacitive, magnetic, and inductive sensors and including non contact electrical field sensors.

It is thus a feature of at least one embodiment of the invention to provide a system that may flexibly adapt to a variety of different sensor types.

The sensor system may provide multiple discrete sensors and output a different count value for a number of turns according to the closest discrete sensor.

It is thus a feature of at least one embodiment of the invention, to provide a simple sensing system providing integer rotation count values.

Alternatively or in addition, the sensor system may provide multiple discrete sensors and output an interpolation between values from the discrete sensors to provide an interpolated angle value between the angle positions of the discrete sensors.

It is thus a feature of at least one embodiment of the invention to provide an rotation sensor that may discriminate among different angles within a turn of the shaft as well as among different angles of different numbers of turns of the shaft.

Alternatively, the sensor system may provide continuous output indicating the position of the marker element along the radial track.

It is thus a feature of at least one embodiment of the invention to provide a rotation sensor that may discriminate among different angles within a turn of the shaft with a continuous output.

The rotation sensor may further include a single-turn or absolute rotation sensor attached to the shaft for providing an indication of a plurality of angular positions within a range of 360 degrees of shaft rotation.

It is thus a feature of at least one embodiment of the invention to provide a system that may be used to augment single-turn absolute rotation sensors.

The spiral track may be mounted to rotate with the shaft.

It is thus a feature of at least one embodiment of the invention to simplify integration of the radial guide with sensors by moving the permanent magnet material to the spiral guide.

The spiral path of the spiral guide may have a radial extent no less than a radial extent of the radial path.

It is thus a feature of at least one embodiment of the invention to provide a system that may accommodate overtravel by ensuring that the marker element can be recaptured by the spiral element.

These particular objects and advantages may apply to only some embodiments falling within the claims and thus do not define the scope of the invention.

DETAILED DESCRIPTION OF THE PREFERRED EMBODIMENT

Figure 1:
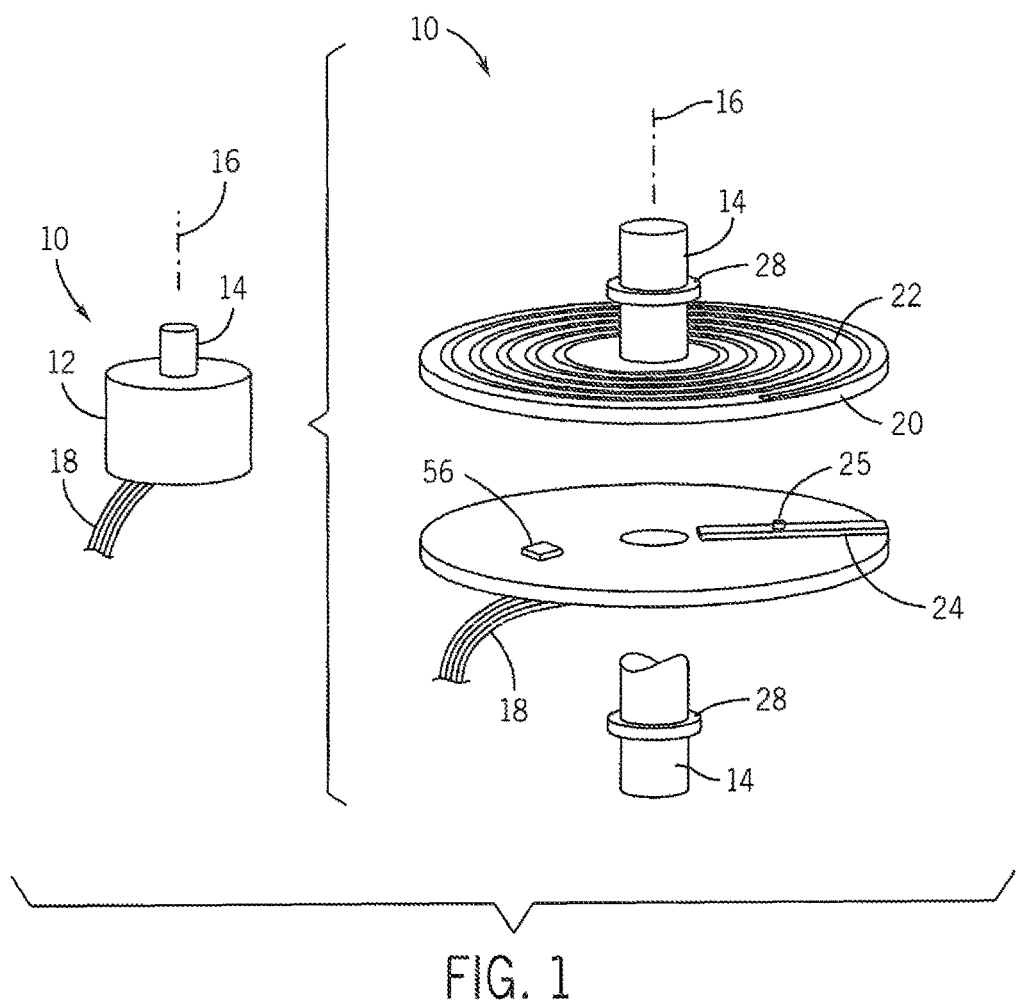
FIG. 1 is a simplified perspective view of an rotation sensor according to one embodiment of the present invention, with the rotation sensor also shown in exploded view with the housing removed to reveal a rotating spiral guide and fixed radial guide holding a marker element.

Referring now to FIG. 1, a rotation sensor 10 per the present invention may provide a housing 12 through which a shaft 14 may project. The remainder of the shaft 14 may extend through the housing 12 and be supported by the housing 12 to rotate about an axis 16 with respect to the housing 12. Electrical conductors 18 may pass out of the housing 12 to provide electrical signals indicating an absolute rotary position of the shaft 14 with respect to the housing 12.

Within the housing 12, the shaft 14 may attach to a first spiral guide disk 20 extending in a plane generally perpendicular to the axis 16. The spiral guide disk 20 may support on one face a helical magnetic spiral 22 of a magnetized permanent magnet material. Generally, the magnetic spiral 22 follows the path of an Archimedean spiral and extends multiple turns around the axis 16, having an expanding radius as a function of angle. The magnetic spiral 22, through magnetic attraction, will provide a spiral guide for a marker element as will be described below.

Positioned adjacent to the spiral guide disk 20 is a radial guide 24 also extending in a plane generally perpendicular to the axis 16 but fixed with respect to the housing 12. The radial guide 24 may hold a marker element 25 to slide along the radial guide 24 while being constrained against movement in a circumferential direction. The marker element 25 may be, for example, a magnetic particle 26 including but not limited to a solid ferrous material, a ferrofluid, or a solid permanent magnet coated with ferrofluid material.

The shaft 14 may be supported at opposite ends by rotary bearings 28 as is generally understood in the art.

Figure 2:
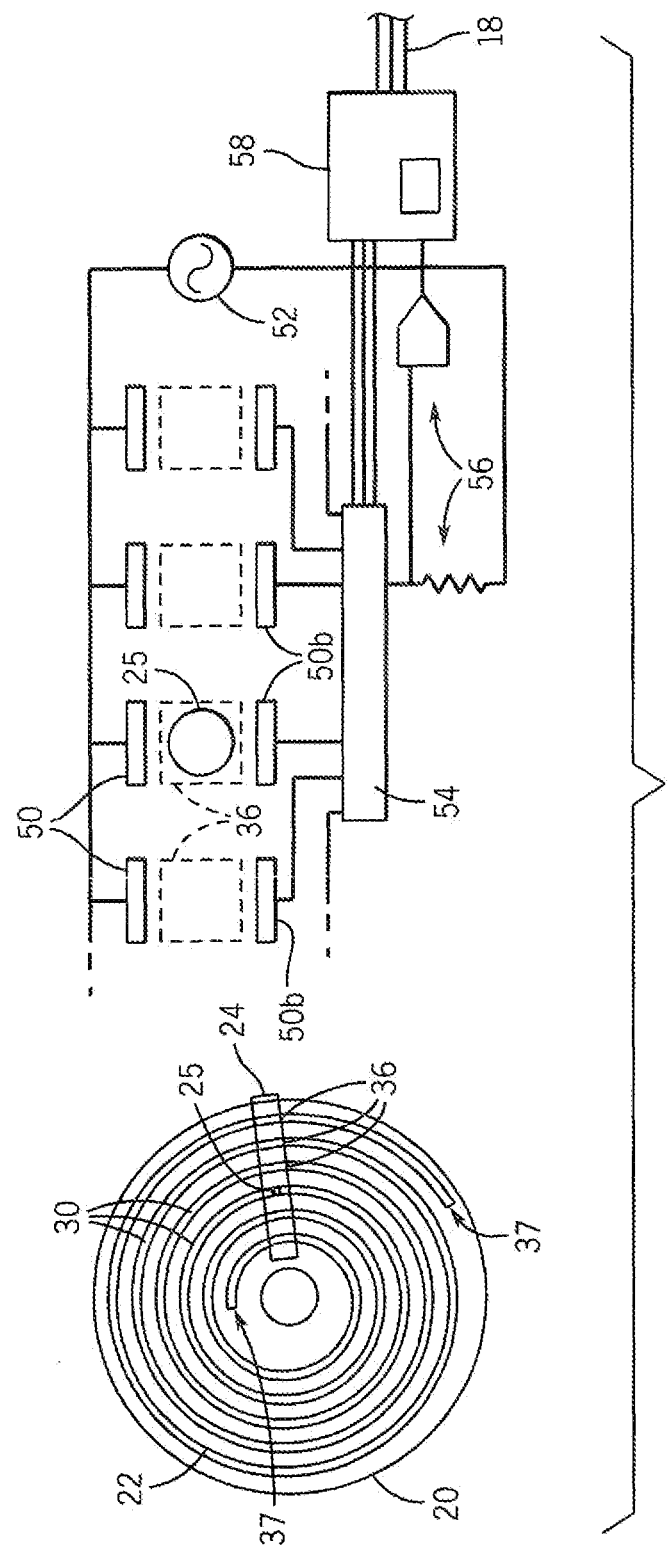
FIG. 2 is a simplified top plan view of the spiral guide in phantom revealing the radial guide beneath it and showing a detail of a sensor structure on the radial guide for determining location of the magnetic element.

Referring now to FIG. 2, as held in the radial guide 24, the marker element 25 will be attracted to a given turn 30 of the magnetic spiral 22 and will be held radially centered along that turn by a magnetic attraction. Accordingly, rotation of the spiral guide disk 20, and hence the magnetic spiral 22, will cause the marker element 25 to move radially along the radial guide 24 to retain its centered position on each turn 30. With successive rotations of the spiral guide disk 20, the magnetic marker element 25 is passed smoothly and continuously among turns 30 of smaller radius (for a clockwise magnetic spiral 22 and clockwise rotation of the shaft 14 as depicted in FIG. 2) or to turns 30 of larger radius (for a clockwise magnetic spiral 22 and counterclockwise rotation of the shaft 14). As the magnetic marker element 25 moves along the radial guide 24, it will pass through multiple sensing locations 36 so that its position may be detected.

Referring still to FIG. 2, in one embodiment the radial position of the marker element 25 along the radial guide 24 may be determined by placement of electrodes 50a and 50b on opposite sides of the radial guide 24 at each sensing location 36 to flank the marker element 25 when it is at the given sensing location 36. In one embodiment, electrodes 50a and 50b may electrically contact the marker element 25 to measure a change of resistance between the electrodes 50*a* and 50*b* with the presence and absence of the marker element 25. Noncontact electrical measurement, however, may alternatively be obtained by placing electrodes 50*a* and 50*b* in close proximity to the marker element 25 at each of the sensing locations 36 so that they may measure change in electrical qualities of the circuit formed with electrodes 50*a* and 50*b* with the presence and absence of the magnetic marker element 25. For example, a sinusoidal voltage from a voltage source 52 may be imposed across the electrodes 50*a* and 50*b* and changes in an AC impedance (inductance or capacitance) in a circuit so formed can be measured such as will change, according to the presence or absence of the magnetic marker element 25, indicating the presence or absence of the marker element 25. Likewise, a magnetic hysteresis caused by the presence of the marker element 25 in the environment of a changing magnetic field, for example, generated when electrodes 50*a* and 50*b* provide coil forms generating a magnetic field, may be detected.

In one embodiment, each of the electrodes 50*a* be commonly driven and each of the electrodes 50*b* separately measured by being connected through a multiplexer 54 controlled by a microprocessor 58 to selectively connect one electrode 50*b* at a time to a sensing circuit 56. The sensing circuit 56 may measure changes in voltage or current and may provide an input to the microprocessor 58, for example, via an analog-to-digital converter. Analysis of the signals from the sensing circuit 56 may thus be used to determine a location of the magnetic marker element 25 along the radial guide 24. This location, determined by the closest sensing location 36 (e.g., closest electrodes 50*a* and 50*b*) indicates the absolute number of rotations of the shaft 14 and may be output from the microprocessor 58 as an angular output signal through conductors 18.

Specified or dedicated electrodes 50 may be placed at end-of-travel positions 37 to provide a signal indicating the marker element has arrived at the end of the magnetic spiral 22 signaling a likelihood that the travel range of the rotation sensor 10 has been exceeded and thus that the absolute number of rotations output from the microprocessor 58 cannot be trusted.

Figure 3A:
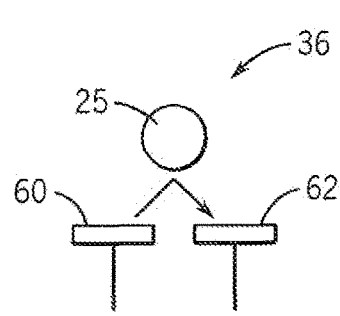
FIGS. 3a and 3b are fragmentary views of alternative embodiments of the sensors of the sensor system of FIG. 2.
Figure 3B:
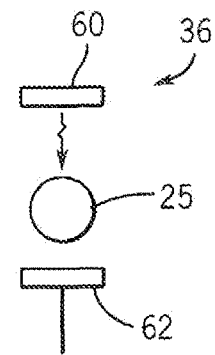

Referring to FIG. 3*a*, it will be appreciated that alternative sensing systems may be employed for detection of the position of the magnetic marker element 25 including those having a photoemitter 60 that may project light upward into the sensing location 36 to be reflected downward to a photodetector 62 when a magnetic marker element 25 is in a sensing location 36. The photodetector 62 may be connected to multiplexer 54 to permit measurement of the reflected light such as indicates presence or absence of the marker element 25. Similarly as shown in FIG. 3*b*, the photoemitter 60 and photodetector 62 may be placed on opposite sides of the marker element 25 when the marker element 25 is in the sensing location 36 to detect the marker element 25 when it blocks transmitted light energy from the photoemitter 60.

Figure 4:
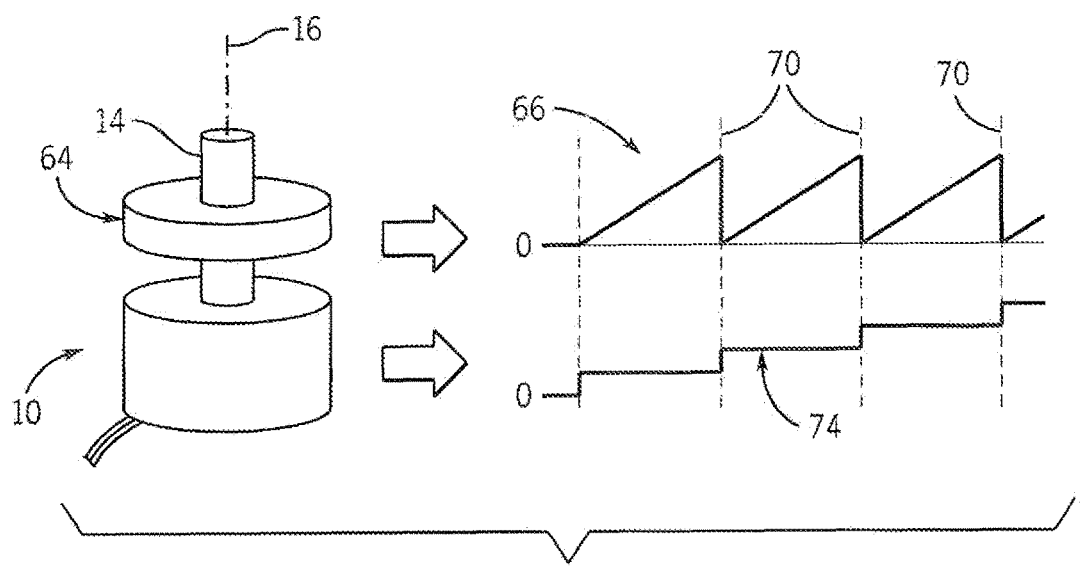
FIG. 4 is an exploded perspective view of the rotation sensor FIG. 1 attached to an absolute rotation sensor and showing signals from each.

Referring now to FIG. 4 the rotation sensor 10 of the present invention, measuring multiple turns of the shaft 14, may be advantageously combined on a single shaft 14 with an absolute, single-turn rotation sensor 64 providing high-resolution measurement of a single shaft rotation. As will be understood to those of ordinary skill in the art, the single-turn rotation sensor 64 may be adjusted to provide an output signal 66 having a value of zero when the marker element 25 is at one extreme position along the radial guide 24, for example, the inner limit of the radial guide 24 representing a full clockwise limit of the rotation sensor 10. The output signal 66 will climb to a peak value after one full counter-clockwise revolution of the shaft 14 before dropping back to the zero value again at a rollover angle 70 generally corresponding to the angular position of zero. The single-turn rotation sensor 64 may thus provide multiple output values that uniquely identify multiple angular positions within one rotation of the shaft 14 but may not indicate how many rotations of the shaft have occurred.

An output from the rotation sensor 10, in this case, can augment the signal 66 from the single-turn rotation sensor 64 to provide an indication of how many rotations of the shaft 14 have occurred. The rotation sensor 10 provides for a generally rising turn-count signal 74 whose magnitude indicates total number of turns. As noted above, the turn-count signal 74 may be determined by a microprocessor 58 (shown in FIG. 2) polling the sensing locations 36 to determine the closest sensing location 36 to the given magnetic marker element 25. For this purpose, the pitch of the magnetic spiral 22 may ideally match the pitch of the spacings of the sensing locations 36, and the rollover angle 70 of the signal 66 may be adjusted so that the magnetic marker element 25 is aligned in a sensing location 36 for maximum sensor signal at the rollover angles 70. Each rising count value of count value signal 74 represents an additional 360 degrees of travel which may be added to the output signal 66 to provide a high-resolution multi-turn angular measurement.

Figure 5:
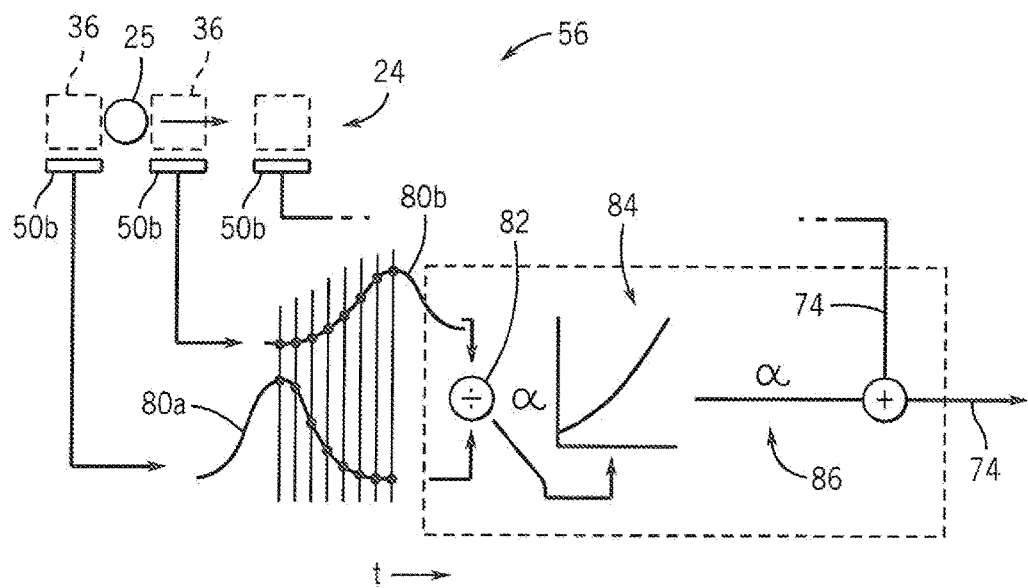
FIG. 5 is a graphical representation of a method of calculating intra-turn angle from the discrete sensors of FIGS. 2 and 3.

Referring now to FIG. 5, the present rotation sensor 10 may also be used without an absolute single-turn rotation sensor 64 while still providing intra-turn angular discrimination. This additional discrimination is obtained by providing an output signal 74 that indicates the position of the marker element 25 not only at the sensing locations 36 but in between the sensing locations 36. This may be accomplished with a discrete sensor system described above by noting the signal strength from each sensor (e.g., pairs of electrodes 50*a* and 50*b*). For example, a first electrode 50*b* may provide a varying signal strength 80*a*, and a second electrode 50*b* may provide a second varying signal strength 80*b* as the marker element 25 moves radially along the radial guide 24 past the adjacent sensing locations 36 of the first and second electrodes 50*b*. In one embodiment, signals 80*a* and 80*b* from the two closest sensing locations 36 to the marker element 25 are identified and a ratio of the signals 80 associated with these sensing locations determined as indicated by divider 82. This ratio may be applied to a lookup table 84 relating that ratio to an empirically determined intra-turn angle of the shaft a forming signal 86. This value, analogous to signal 66 in FIG. 4, may be summed to the signal 74, determined as described above, indicating the closest sensing location 36, the signal 74 increasing by 360 degrees with each turn count. The sum can then be output as signal 74' on conductors 18 to provide a high-resolution multi-turn rotation sensor output value.

Figure 6:
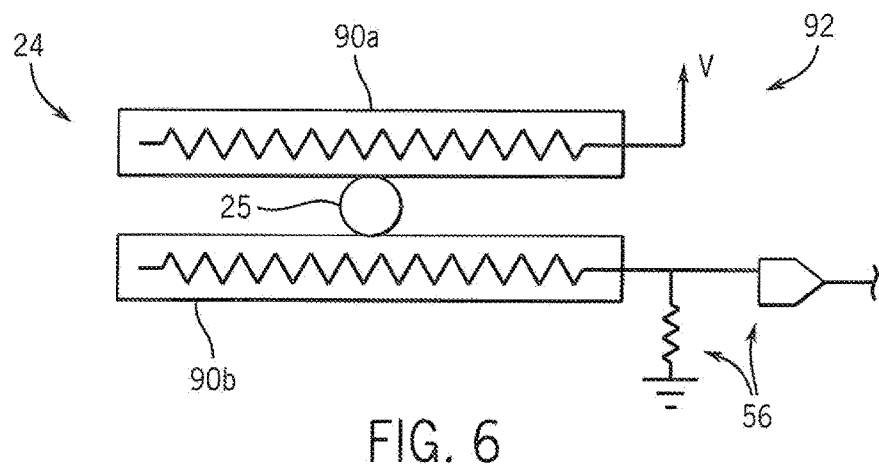
FIG. 6 is a figure similar to that of the sensor system of FIG. 2 showing a sensor providing a continuous output for intra-turn measurement.

Referring now to FIG. 6, intra-turn angular resolution can also be obtained, for example, by constraining an electrically conductive marker element 25 between two resistive tracks 90*a* and 90*b* which provide walls of the radial guide 24. Current flowing from resistive track 90*a* from a voltage source 92 through the marker element 25 to be received by resistive track 90*b* will experience a varying resistance depending on the position of the marker element 25 along the radial guide 24. This resistance may be measured by sensing circuit 56 to provide a continuous measurement of rotational position with a finer resolution than single turns. The further the marker element 25 moves inward along the radial guide 24 guide, the more resistance will be measured. This technique may be combined with discrete position sensors discussed above and it will be appreciated that there are other methods to provide continuous position measurement as well.

It is noted that there need only be relative rotation between the magnetic spiral 22 and the radial guide 24, and therefore that either can be fixed with respect to the housing 12 or attached to the shaft 14. The invention contemplates other embodiments, for example, in which the magnetic spiral 22 is replaced with a spiraling channel holding the marker element 25 and the radial guide 24 is a magnetic material attracting the marker element 25 to travel along the radial guide 24 as constrained by the spiral channel.

It will be understood that the present invention is applicable to a wide variety of applications and can replace conventional encoders, resolvers, eddy current sensors, and even operate in the context of sensorless motor to replace a two pole resolver over a limited angular range.

The word "magnetic" may indicate either a ferromagnetic material that does not generate its own magnetic field or a material generating a magnetic field in the manner of a permanent magnet accordingly and should be interpreted according to context.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an" "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An absolute rotation sensor comprising:
   a housing adapted to receive a shaft rotatable along an axis;
   a marker element being a magnetic particle;
   a radial guide slidably supporting the marker element to move along a radial path perpendicular to the axis;
   a spiral guide corralling the marker element to follow a spiral path about the axis, wherein the marker element is guided by magnetic attraction between the marker element and at least one of the radial guide and spiral guide:
   wherein one of the radial guide and spiral guide are attached to the shaft, so that the spiral guide rotates about the axis with respect to the radial guide causing the marker element to move progressively along radial path with rotation of the shaft; and
   a sensor system identifying a location of the marker element along the radial guide to output at least a number of turns of the shaft according to a position of the marker element along the radial guide.

2. The rotation sensor of claim 1 wherein the spiral guide extends greater than 720 degrees about the axis.

3. The rotation sensor of claim 1 wherein the marker element is a ferromagnetic material.

4. The rotation sensor claim 3 wherein the marker element is selected from the group consisting of: a ferromagnetic bead, a droplet of ferrofluid, and a droplet of ferrofluid surrounding a magnetized bead.

5. The rotation sensor of claim 1 wherein the radial guide is a groove constraining the marker element therein.

6. The rotation sensor of claim 1 wherein the spiral guide is a magnetic material attracting the marker element within the radial guide.

7. The rotation sensor of claim 1 wherein the sensor system uses sensors selected from the group consisting of: optical, resistive, capacitive, magnetic and inductive sensors.

8. The rotation sensor of claim 7 wherein the sensor system uses noncontact electrical field sensors.

9. The rotation sensor of claim 1 wherein the sensor system provides multiple discrete sensors to provide a different count value for a number of turns according to which discrete sensor the marker element is closest.

10. The rotation sensor of claim 1 wherein the sensor system provides multiple discrete sensors and outputs an interpolation between values from the discrete sensors to provide an interpolated angle value between the angle positions of the discrete sensors.

11. The rotation sensor of claim 1 wherein the sensor system provides a continuous output value indicating the location of the marker element along the radial guide.

12. The rotation sensor of claim 1 further including a single-turn absolute rotation sensor attached to the shaft for providing an indication of a plurality of angular positions within a range of 360 degrees of shaft rotation.

13. The rotation sensor of claim 1 wherein the sensor system provides an electrical output connector providing a signal indicating a number of rotations of the shaft.

14. The rotation sensor of claim 1 wherein the spiral guide is mounted to rotate with the shaft.

15. The rotation sensor claim 1 wherein the spiral path of the spiral guide has a radial extent no less than a radial extent of the radial path.

16. A method of measuring absolute rotational turns employing a rotation sensor having:
- a housing adapted to receive a shaft rotatable along an axis;
- a marker element being a magnetic particle;
- a radial guide slidably supporting a marker element to move along a radial path perpendicular to the axis;
- a spiral guide corralling the marker element to follow a spiral path about the axis wherein the marker element is guided by magnetic attraction between the marker element and at least one of the radial guide and spiral guide;
- wherein one of the radial guide and spiral guide are attached to the shaft so that the spiral guide rotates about the axis with respect to the radial guide causing the marker element to move progressively along the radial path with rotation of the shaft; and
- a sensor system identifying a location of the marker element along the radial guide to output at least a number of turns of the shaft according to a position of the marker element along the radial guide;

the method comprising:
(a) rotating the shaft to move the marker element along the radial path under an influence of the spiral guide;
(b) sensing the location of the marker element to reveal a number of turns of the shaft according to a position of the marker element along the radial guide.

17. The method of claim 16 wherein the sensing determines the position of the marker element with respect to multiple discrete radially separated sensor elements to determine a closest sensor element and provides a turn number equal to a number of the sensor elements in a radial sequence.

18. The method of claim 16 wherein the sensing determines a position of the marker element with respect to multiple discrete radially separated sensor elements to determine two closest sensor elements and a relative separation between the marker element and the two closest sensor elements to provide an angle number within a single turn being a function of the relative separation between the marker element and each of the two closest sensor elements.

* * * * *

UNITED STATES PATENT AND TRADEMARK OFFICE
CERTIFICATE OF CORRECTION

PATENT NO. : 9,851,225 B2  
APPLICATION NO. : 14/705178  
DATED : December 26, 2017  
INVENTOR(S) : Gregory et al.

Page 1 of 1

It is certified that error appears in the above-identified patent and that said Letters Patent is hereby corrected as shown below:

On the Title Page

Column 1, Line 1, in the Title, replace "Multitum" with "Multiturn"

In the Claims

Claim 1, Column 8, Line 20, replace "shaft," with "shaft".

Signed and Sealed this  
Tenth Day of April, 2018

Andrei Iancu  
*Director of the United States Patent and Trademark Office*